United States Patent
Fichter et al.

(10) Patent No.: US 7,543,189 B2
(45) Date of Patent: Jun. 2, 2009

(54) AUTOMATED MULTILINGUAL SOFTWARE TESTING METHOD AND APPARATUS

(75) Inventors: George M. Fichter, Lexington, MA (US); Mikhail I. Kliorin, Nashua, NH (US); Ban Keng Lau, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 11/170,383

(22) Filed: Jun. 29, 2005

(65) Prior Publication Data

US 2007/0006039 A1    Jan. 4, 2007

(51) Int. Cl.
G06F 11/00 (2006.01)
(52) U.S. Cl. .......................... 714/38; 704/8
(58) Field of Classification Search .................. 714/38
See application file for complete search history.

(56) References Cited

U.S. PATENT DOCUMENTS

| | | | |
|---|---|---|---|
| 5,243,519 A | | 9/1993 | Andrews et al. |
| 5,903,859 A | * | 5/1999 | Stone et al. |
| 5,950,004 A | * | 9/1999 | Bearse et al. ............... 717/146 |
| 5,974,372 A | | 10/1999 | Barnes et al. |
| 6,092,037 A | | 7/2000 | Stone et al. |
| 6,119,078 A | * | 9/2000 | Kobayakawa et al. .......... 704/3 |
| 6,311,151 B1 | | 10/2001 | Yamamoto et al. |
| 6,363,337 B1 | * | 3/2002 | Amith ........................... 704/7 |
| 6,507,812 B1 | * | 1/2003 | Meade et al. .................. 704/8 |
| 6,530,039 B1 | * | 3/2003 | Yang |
| 6,546,365 B1 | | 4/2003 | Gajda et al. |
| 6,567,973 B1 | * | 5/2003 | Yamamoto et al. .......... 717/136 |
| 6,907,546 B1 | * | 6/2005 | Haswell et al. |
| 6,920,630 B2 | * | 7/2005 | Jackson ...................... 717/168 |
| 6,931,628 B2 | * | 8/2005 | McGeorge et al. |
| 6,983,451 B2 | * | 1/2006 | Colaiuta |
| 6,993,748 B2 | * | 1/2006 | Schaefer |
| 7,055,067 B2 | * | 5/2006 | DiJoseph |
| 7,146,358 B1 | * | 12/2006 | Gravano et al. ................ 707/4 |
| 7,299,452 B1 | * | 11/2007 | Zhang et al. |
| 7,308,399 B2 | * | 12/2007 | Fallen-Bailey et al. |
| 2002/0083216 A1 | * | 6/2002 | Hickson et al. |
| 2002/0193985 A1 | * | 12/2002 | Park .............................. 704/8 |
| 2003/0135360 A1 | | 7/2003 | Barker et al. |
| 2004/0148591 A1 | * | 7/2004 | Kumhyr et al. ............. 717/137 |
| 2004/0205721 A1 | * | 10/2004 | Colaiuta |
| 2004/0268257 A1 | | 12/2004 | Mudusuru |
| 2005/0033953 A1 | * | 2/2005 | Fisher ........................... 713/2 |
| 2005/0065772 A1 | * | 3/2005 | Atkin et al. .................... 704/2 |
| 2005/0137844 A1 | * | 6/2005 | Voruganti ...................... 704/2 |
| 2005/0193263 A1 | * | 9/2005 | Watt |
| 2005/0228808 A1 | * | 10/2005 | Mamou et al. .............. 707/100 |

(Continued)

*Primary Examiner*—Robert Beausoliel
*Assistant Examiner*—Amine Riad
(74) *Attorney, Agent, or Firm*—Hamilton, Brook, Smith & Reynolds, P.C.

(57) ABSTRACT

A computer system and method tests various language installations of an application program using a single test script. The various language translations existing with the application program are used to provide translations of test command strings from one language to the specific language of the application program (operating system locale for executing the program). The test script may then be translated at runtime using the predefined program-established translations to allow the testing program to test the application program in accordance with the language of the application program/operating system locale.

24 Claims, 5 Drawing Sheets

U.S. PATENT DOCUMENTS

2005/0273849 A1* 12/2005 Araujo et al. .................. 726/12
2006/0174196 A1* 8/2006 Zhang et al. ................ 715/523
2007/0282594 A1* 12/2007 Spina ............................ 704/9
2008/0195377 A1* 8/2008 Kato et al. ..................... 704/8

* cited by examiner

FIG. 3

| RX140_vk_Resource - Eclipse Platform | |
|---|---|
| RX140_ay_File  RX140_bs_Edit  RX140_bx_Navigate  Search  RX140_cc_Project  Run  RX140_cx_Window | |
| RX140_az_New | RX116_aa_AltRX121_aa_+RX116_ad_ShiftRX121_aa+N |
| RX124_ai_Close | RX116_ac_CtrlRX121_aa_+RX116_ar_F4 |
| RX124_aa_Close All | RX116_aa_CtrlRX121_aa_+RX116_ad_ShiftRX121_aa+RX116_ar_F4 |
| RX124_ak_Save | RX116_ac_CtrlRX121_aa_+S |
| RX124_am_Save As... | |
| RX124_ao_Save All | RX116_ac_CtrlRX121_aa_+RX116_ad_ShiftRX121_aa_+S |
| RX124_aq_Revert | |
| RX124_as_Move... | |
| RX124_au_Rename... | RX116_ap_F2 |
| RX124_aw_Refresh | RX116_as_F5 |
| RX124_ba_Print... | RX116_ac_CtrlRX121_aa_+P |
| RX140_ba_Switch Workspace... | |
| Open External File... | |
| RX124_bf_Import... | |
| RX124_bd_Export... | |
| RX124_ay_Properties | RX116_aa_AltRX121_aa_+RX116_bx_Enter |
| 1 Sample.java [TestProject/folder] | |
| 2 class3.java [New JavaCode/testDir] | |
| 3 class2.java [New JavaCode/testDir] | |
| 4 class1.java [New JavaCode/testDir] | |
| RX124_bj_Exit | |

31a — (top row)  
31n — (bottom rows)  
33

AUTOMATED MULTILINGUAL SOFTWARE TESTING METHOD AND APPARATUS

BACKGROUND OF THE INVENTION

Automated software testing has many benefits for the software industry, and various tools are widely used. One of the major benefits of automated testing is that a test is written once and can be run many times. For example, when a change is made to the software, an automated test is the only efficient way to perform regression testing to assure that no new defects were added.

Another potential advantage is the ability to write a test for the initial language of the product, such as English, and then use the test for all the other languages of the product. For example, Eclipse is available in nine languages, so it would be helpful to have a single test that works on all languages.

Currently available techniques generally do nothing to facilitate multilingual testing. Most current methods require separate translations for user interface and data elements for each language tested. This allows switching languages, but the process of creating the data is essentially manual and requires special technical and linguistic expertise. There is no way to create the strings automatically, or to access strings used by the product under test.

Further, there exists the problem of dynamically discovering locale-related resources on an Eclipse platform that is under test by an automated test tool. These locale-related resources, typically textual strings, are used by a test tool (for example IBM Rational Functional Tester) in order to drive the application under test.

Typically to use an automated test tool, in particular a GUI (graphical user interface) test tool, on an Eclipse-based application, there are about 2 main approaches:

1. Extract all locale-related resources, such as textual strings in a base language (typically English) from a test script to one or several external Java "ResourceBundle" files. The number of these files is as many as the number of localized languages that an Eclipse-based application needs to support. These files are then translated, with the "base string" acting as the key and a corresponding value acting as the equivalent localized string in the target language.

It is noted that these external Java ResourceBundle files do not belong to the Eclipse-based application under test and are a duplication of a subset of ResourceBundles that are only relevant to and used by the automation tool.

2. Make available in the automated test tool's Java classpath the locations of all the ResourceBundle files that might be required by the tool, typically by specifying the jars files. These ResourceBundle files belong to the Eclipse-based application under test and need to be actively set up by the tester in the test tool.

The drawbacks of these two approaches are as follows.

Solution 1. above duplicates the creation of the ResourceBundle files of the Eclipse-based application under test and raises the issues of synchronizing the contents files with the ResourceBundles of an application under test in the long run. Over ten or more localized languages, this approach/solution becomes prohibitive in terms of time, manpower and costs.

Of the two solutions above, the second is preferred as it does not duplicate the creation of the ResourceBundle files of the Eclipse-based application under test. However, implicit in both solutions above is the requirement to know what the ResourceBundle files are and their locations. These files might be split or renamed from release to release. Insidious to the this approach is that ResourceBundles specific to the test tool(which is also Eclipse-based) might be accidentally picked instead of those from the application under test.

There is also an issue that the locale of the application under test might be different from the default locale of the OS system (operating system). Example, it is possible to run a localized Japanese Eclipse-based application on an English OS system.

Further Solution 2. needs to be able to have a means to dynamically discover the ResourceBundles it potentially needs according to the locale of the application under test.

SUMMARY OF THE INVENTION

The present invention seeks to address the above drawbacks and problems of the prior art.

In a preferred embodiment, the invention provides a system and method of testing an application program using a test script containing test commands in a first language. The application program has a different or second language. The invention method comprises the computer implemented steps of:

(i) determining resource file of the application program having translations to the second language, and (ii) accessing the determined resource file and obtaining translations of the test commands in the second language. The resource file is a prior established file of the application program and is a supporting file such as a property file, resource bundle or the like.

Accordingly, one of the main ideas of the present invention is to employ the translations used in the software application itself for comparisons used in the automated software tests. This completely eliminates the cost of translation for the tests, and it also insures that the translations match the actual software application under test. If translations in the software application change, they are automatically updated in the tests.

By virtue of the automatic nature of this process, anyone can make use of the translations without special technical or linguistic knowledge.

In addition to the main idea, the present invention provides the extracting of translations from the application under test, for modifying the tester tool so it will recognize translated program elements, and for automatically adjusting tests to use locale-specific data such as dates and times.

Applicants have discovered that by dynamically querying the application for its property files (e.g., ResourceBundles in Java program applications), one can have a resilient, flexible and reliable way of using the correct property files/resource files specific to the application under test in a specific locale. This eliminates hard-coded path and maintenance issues over all the localized languages that an application supports. Another added benefit of this approach is the ability to load non-ResourceBundle related resources such as .gifs, .jpeg, .class, etc.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is schematic view of a menu in a tagged system (application).

DETAILED DESCRIPTION OF THE INVENTION

Figure 1:
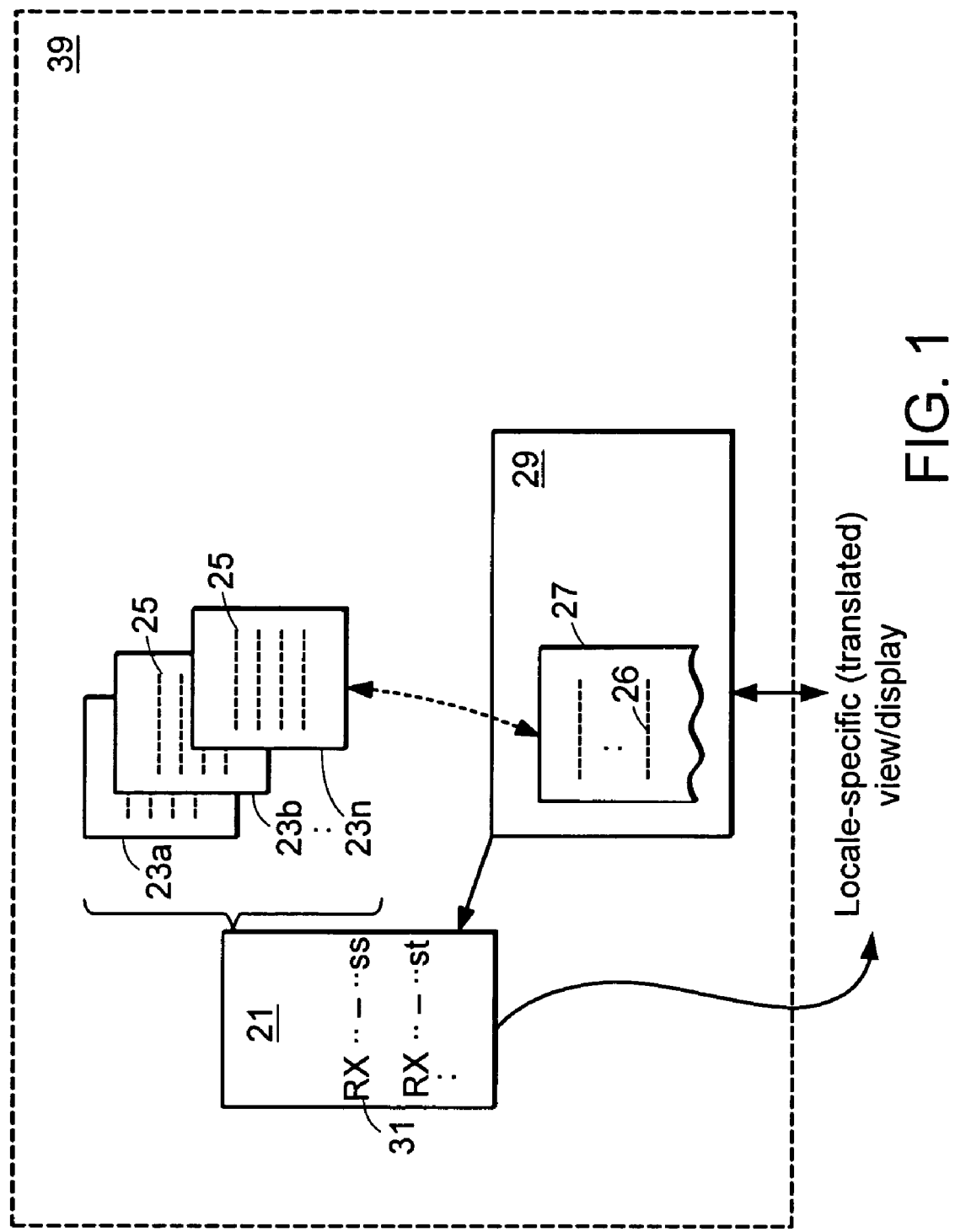
FIG. 1 is a schematic view of the present invention.

A description of preferred embodiments of the invention follows.

The present invention is directed toward the testing of multilingual software programs and hence the testing of a translated program. The subject software programs support program execution in various languages and thus have respective translations established/existing with the software programs. With respect to a tester, these translations are pre-existing or predefined, program-established translations.

As will become clearer below, in the testing of such software programs, the present invention takes advantage of the pre-existing translations (i.e., predefined or established with the software programs), and uses the translations for validation purposes, in comparisons and in other aspects of testing. In particular, the translations are used to translate the test script/test comments at runtime such that testing is done in the language of the subject software program.

The present invention is also directed toward the extracting of translations from the software program being tested, so that the tester recognizes the translated program elements and automatically adjusts tests/test commands to use (display) locale-specific data such as dates and times. Thus the present invention provides a method and technique to interrogate a software program (test subject) to determine the current language translations of a given key or tag (as a URL) as further discussed below.

By way of background, a key notion for internationalization of software is the "externalized string". If human-readable text is embedded in program source code, it would be impossible to translate the software without editing the business logic of the program itself. Instead, a well-written program places all user-readable text into a separate file that can be duplicated for each language. Each separate file stores or holds the user readable text, in a respective language, as externalized strings. There is a different one of these separated files for each different language supported.

The use of a separate file per language makes it possible to record a script against a "tagged" application on an operating system in one language and play it back on any supported locale (i.e., in a different language). As illustrated in FIG. 3, a "tagged" application 33 means that a unique tag 31 precedes each of externalized strings and this tag 31 compresses information about a keyword and an address of a corresponding translation. For instance, the menu item "New" is displayed as "RX140-az_New" on such tagged system, and the tag "RX140_az" is a pointer to the keyword/address for a respective language translation of word "New". In this case the tagged string "RX140_az_New" becomes a recognition property during script recording.

In a separate step, the tag "RX140_az" is used to identify the specific file and key/value pair associated with string "RX140_az_New". That key/value pair can now be used in any language to get the current translation of "New". This tagging concept is needed to find the correct translation as there may be many key/value pairs translating common words like "New". Thus tagging is a technique used during test development to identify strings.

The key/value pair is then used as a key for the runtime search for the translation of word "New" in order to replace the displayed version of the subject term ("New") with its appropriate translation "on-the-fly" (during runtime).

In the case of subject software applications written in Java, the files that contain these externalized strings are called "resource bundles" and they are kept in files called "properties files". For C and C++ Windows programs, the externalized strings are kept in resource files, and Unix has a similar concept for Motif.

The present invention takes advantage of these externalized strings in the test environment, accessing the strings in a way similar to the way the subject software programs themselves (at runtime) access them.

For example, when Eclipse displays a file menu, it shows several keywords, "New", "Open External File . . . ", "Open Workspace . . . ", and so on. For a French installation (of the given software program), the user would see in the displayed screen view "Nouveau", "Ouvrir fichier externe . . . ", "Ouvrir espace de travail". These strings of the French translation of the keywords are kept in respective resource bundles, which are accessed by Eclipse when it comes time to display the keywords/file menu. Each menu item is accessed based on a keyword and an address. Utilizing these keywords and addresses, a tester of the present invention can retrieve the desired string which is the correct language translation of the string and thus can display user-readable text based on the language settings of the software program under test.

Illustrated in FIG. 1 is a subject application 21 under testing by an automated test tool 29 according to the principles of the present invention. The subject application 21 may be, for example, an Eclipse based application, and the test tool 29 is, for example, IBM/Rational Functional Tester with the addition of the present invention techniques. The subject application 21 is a tagged application that has corresponding property files 23 of various languages containing respective resource bundles 25. The resource bundles 25 hold translations of the user readable text strings of interest or externalized strings in a respective language of the property files 23.

The automated test tool 29 accesses the corresponding resource bundle files 25 during testing to similarly translate the test script 27 and test commands 26 in accordance with the runtime language (local installation) of the subject application 21. That is, the operating system 39 has a locale-specific or default language. When the operating system 39 executes the subject application 21, the resource file 23n, 25 of that language is employed to provide the translations of the user readable text in subject application 21 in the locale-specific or default language of the operating system 39. During testing, tester 29 utilizes that same resource file 23n, 25 to provide translations of user readable text in the locale-specific or default language of the operating system 39.

Further, the present invention enables the automated test tool 29 to dynamically discover the resource bundle files 25 it needs according to locale of the subject application 21. In a preferred embodiment, this is accomplished by the following method or process as illustrated in FIG. 2.

Figure 2:
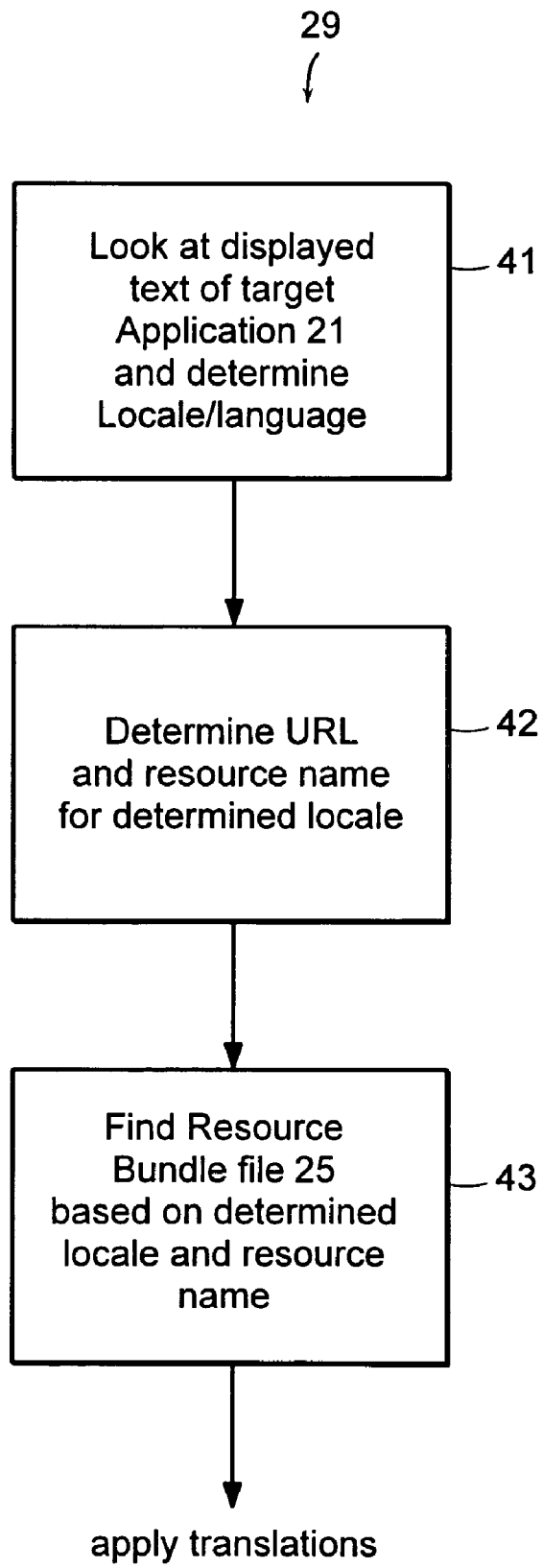
FIG. 2 is a flow diagram of a preferred embodiment.

The tester 29 method or process of the present invention begins with Step 41 shown in FIG. 2. In Step 41 the tester 29 process determines from the target application 21 under test the locale with which the target application 21 was launched.

Next, in Step 42, according to that locale, the process 29 determines the set of resource search paths (URL) used by one or more Eclipse-plugins of interest. This includes URL paths used by the plugin's fragments.

In Step 43, the invention process 29 uses java.net.URL-ClassLoader to find the required ResourceBundle 25 according to a specific locale and resource name.

For example, the English file 23a is called plugin.properties, and the holds the following resource bundle 25.

English:
TopLevelMenu.File=RX140_ay_File
TopLevelMenu.New=RX140_az_New
TopLevelMenu.SwitchWkspc=RX 140_ba_Switch Workspace The German file 23n is called plugin.de.properites and has resource bundles 25:

German:
TopLevelMenu.File=Datei
TopLevelMenu.New=Neu
TopLevelMenu. SwitchWkspc=Arbeitsplatz wechseln In each of the above, the resource name is to the left of the equal sign and serves as a key. To the right of the equal sign is the corresponding value of the respective key.

The application program 21 under test uses these key/value pairs to display the correct language translation of user readable text at run time.

Say the operating system 39 language in FIG. 1 is German. The tester process 29 at Step 41 looks at text displayed by target application 21 and finds, for example, "Arbeitsplatz wechseln". Tester process 29 looks at the portion of tagged application 21 responsible for generating this string value and identifies the corresponding tag 31. From the identified tag 31, tester process 29 (at Step 42) determines the keyword and address (resource name and URL) pointed to by the tag 31. In this example, the resource name is TopLevelMenu.SwitchWkspc. Knowing this resource name and that the locale language is German, tester process Step 43 is able to determine the resource bundle file 25 that it needs for translations of the test script 27/commands 26 to the current operating system 39 locale/language (i.e., German).

Figure 4:
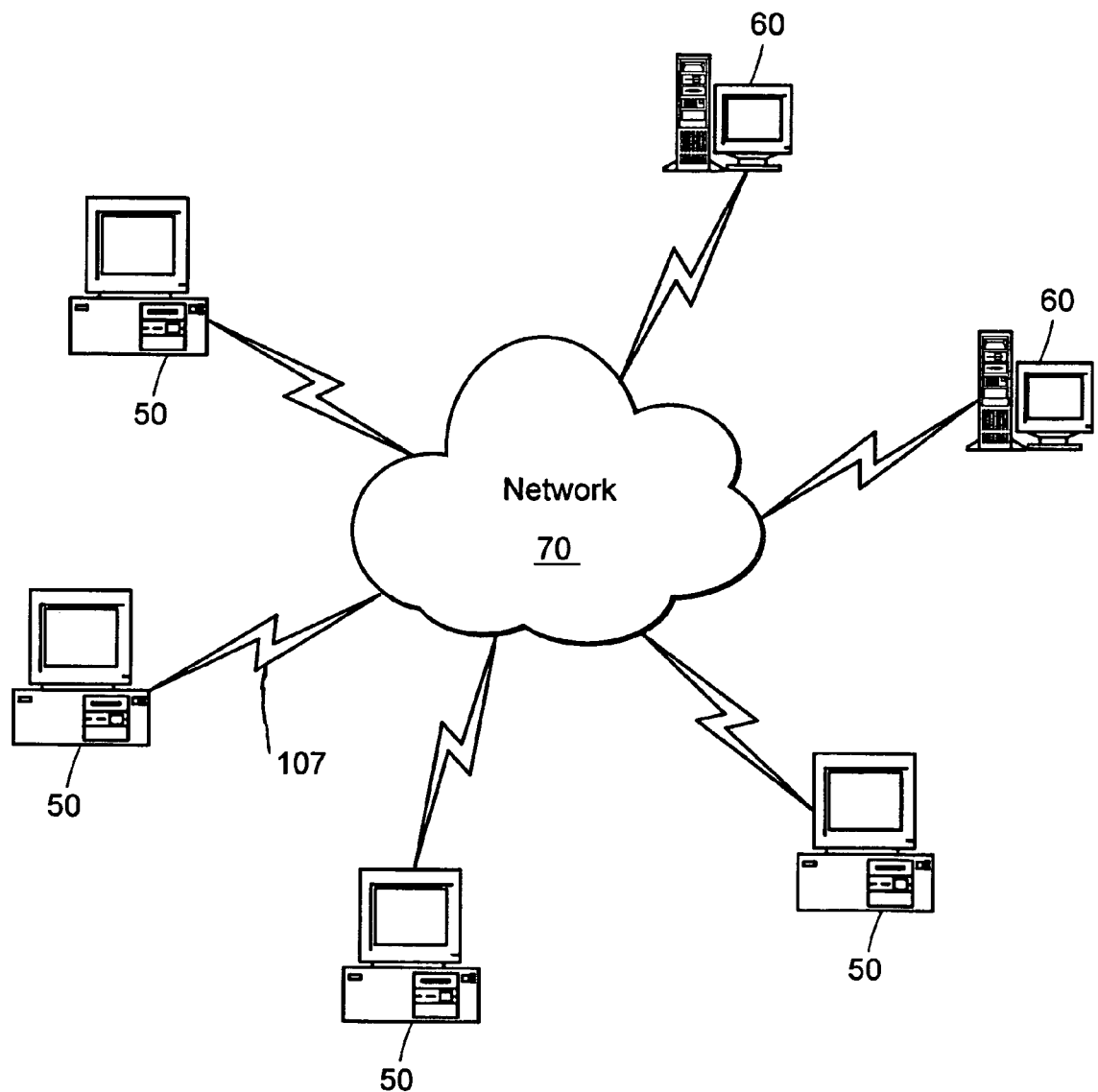
FIG. 4 is a schematic view of a computer environment in which the principles of the present invention may be implemented.

FIG. 4 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
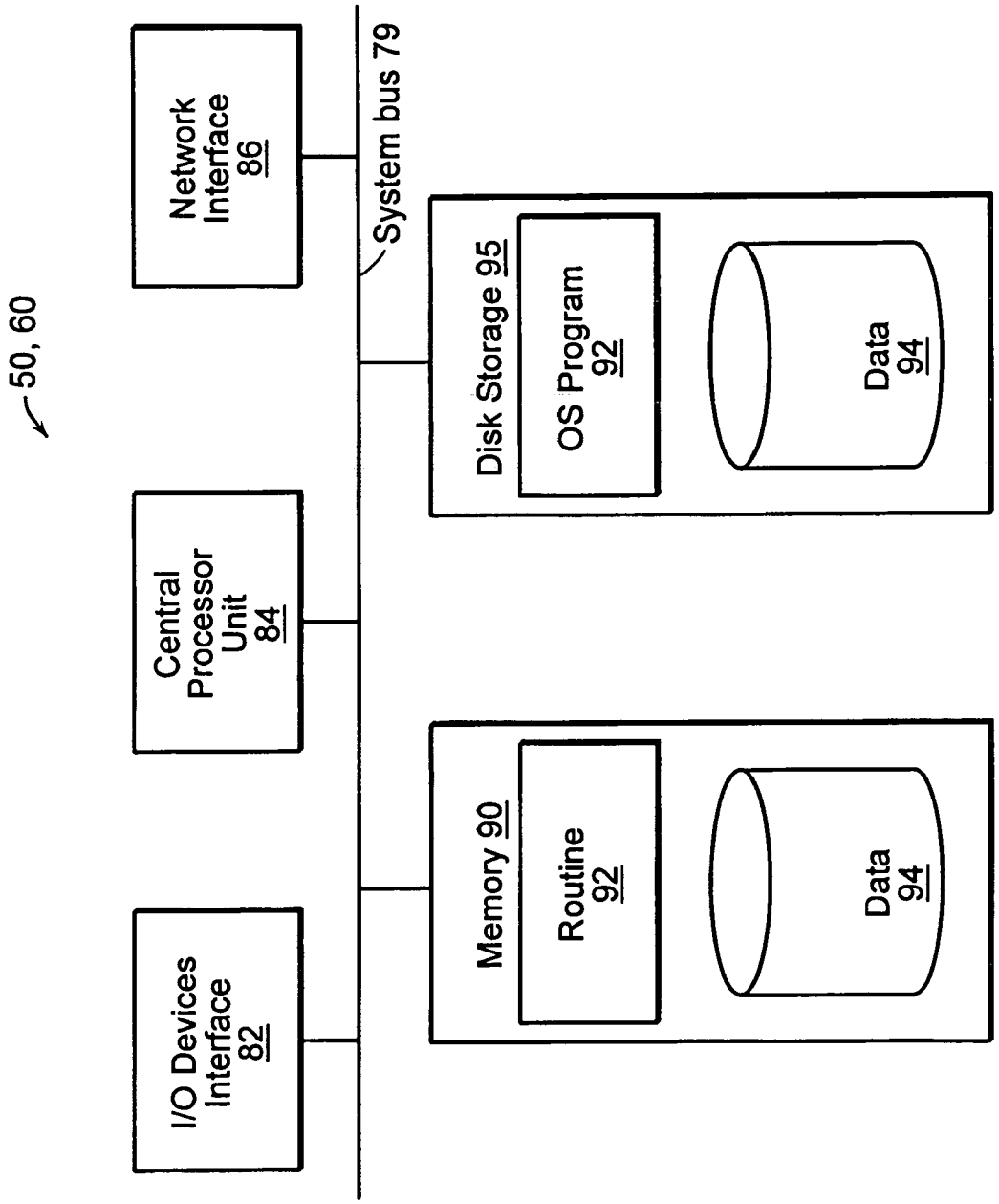
FIG. 5 is a block diagram of the internal structure of a computer from the FIG. 4 computer environment.

FIG. 5 is a diagram of the internal structure of a computer (e.g., client processor 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., test tool 29 and tester method/ process detailed above in FIGS. 1 and 2). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/ program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 4 and 5 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Other platforms besides Eclipse programs are suitable for the present invention. The foregoing examples and discussion in FIGS. 1 and 2 are for purposes of illustration and not limitation of the present invention.

What is claimed is:

1. A method of testing an application program using a test script containing test commands in a first language, the application program having a second language different from the first language, the method comprising the computer implemented steps of:
   employing translations used in the application program itself, comparing test commands in the first language to converted test commands in the second language by:
      determining a support file of the application program supporting program execution in various languages and having translations to the second language, the support file being a prior established file of the application program and the support file having resource name and URL for the second language; and
      accessing the determined support file and obtaining translations of the test commands in the second language.

2. A method as claimed in claim 1 wherein the step of determining includes dynamically querying the application program for the support file.

3. A method as claimed in claim 2 wherein the step of dynamically querying includes:
   determining the second language from displayed text of the application program;
   determining the resource name and URL for the second language; and
   locating support file according to determined resource name and second language.

4. A method as claimed in claim 1 wherein the application program is multilingual and the second language is locale-specific.

5. A method as claimed in claim 1 wherein the support file is any one of a property file, a resource bundle or resource file of the application program.

6. A method as claimed in claim 1 wherein the application program is a tagged application.

7. A computer readable medium for automated testing of an application program, comprising:
   a test script having test commands in a first language, the application program having a second language that is different from the first language; and
   a tester process for providing translations of the test commands in the second language, the tester process employing translations used in the application program itself and comparing test commands in the first language to converted test commands in the second language by accessing supporting files of the application program supporting program examination in plural languages and having translations to the second language, the supporting files being prior established files of the application program and the supporting files having resource name and URL for the second language.

8. The computer readable medium as claimed in claim 7 wherein the supporting files are any of a property file, a resource file or a resource bundle of the application program.

9. The computer readable medium as claimed in claim 7 wherein the application program is multilingual and the second language is locale-specific.

10. The computer readable medium as claimed in claim 7 wherein the tester process dynamically queries the application program for the supporting files.

11. The computer readable medium as claimed in claim 7 wherein the tester process:
   determines the second language from displayed text of the application program;
   determines the resource name and URL for the second language; and
   locates supporting files according to determined resource name and second language.

12. The computer readable medium as claimed in claim 7 wherein the application program is a tagged application.

13. A computer program product comprising a computer readable medium having computer executable instructions for automating testing of application programs, when executed on a computer, the executable instructions causing the computer to perform the steps of:
   testing an application program using a test script having test commands in one language and the application program having a different language;
   employing translations used in the application program itself and comparing test commands in the first language to converted test commands in the second language by:
      determining resource file of the application program supporting program execution in multiple languages and having translations to the second language, the resource file being a prior established file of the application program and the resource file having resource name and URL for the second language; and
      accessing the determined resource file and obtaining translations of the test commands in the second language.

14. A computer program product as claimed in claim 13 wherein the step of determining includes dynamically querying the application program for the resource file.

15. A computer program product as claimed in claim 13 wherein the step of dynamically querying includes:
   determining the second language from displayed text of the application program;
   determining the resource name and URL for the second language; and
   locating resource file according to determined resource name and second language.

16. A computer program product as claimed in claim 13 wherein the application program is multilingual.

17. A computer program product as claimed in claim 13 wherein the second language is locale specific.

18. A computer program product as claimed in claim 13 wherein the application program is a tagged application.

19. A computer readable medium for automated testing of an application program, comprising:
   testing means having a first language, the application program having a second language that is different from the first language; and
   process means providing translations of the testing means to the second language, the process means employing translations used in the application program itself and comparing test commands in the first language to converted test commands in the second language by accessing supporting files of the application program supporting program execution in plural languages and having translations to the second language, the supporting files being application program established files and the supporting files having resource name and URL for the second language.

20. The computer readable medium as claimed in claim 19 wherein the supporting files are any of a property file, a resource file or a resource bundle of the application program.

21. The computer readable medium as claimed in claim 19 wherein the application program is multilingual and the second language is locale-specific.

22. The computer readable medium as claimed in claim 19 wherein the process means dynamically queries the application program for the supporting files.

23. The computer readable medium as claimed in claim 19 wherein the process means:
   determines the second language from displayed text of the application program;
   determines the resource name and URL for the second language; and
   locates supporting files according to determined resource name and second language.

24. The computer readable medium as claimed in claim 19 wherein the application program is a tagged application.

* * * * *